United States Patent [19]
Hallberg

[11] 3,724,205
[45] Apr. 3, 1973

[54] AUTOMATIC TRANSMISSION CONTROL SYSTEM

[75] Inventor: Irving H. Hallberg, Des Plaines, Ill.

[73] Assignee: Borg-Warner Corporation, Chicago, Ill.

[22] Filed: Dec. 1, 1971

[21] Appl. No.: 203,617

[52] U.S. Cl..................................60/19, 60/53 A
[51] Int. Cl...............................F02b 41/00
[58] Field of Search...................60/19, 53 A

[56] References Cited

UNITED STATES PATENTS

| 1,762,534 | 1/1930 | Sorensen | 60/53 A |
| 3,074,296 | 1/1963 | Ebert | 60/53 A UX |
| 3,166,891 | 1/1965 | Weisenbach | 60/19 |
| 3,173,243 | 3/1965 | Reinke | 60/19 |
| 3,230,699 | 1/1966 | Hann et al. | 60/19 |
| 3,284,999 | 11/1966 | Lease | 60/19 |

Primary Examiner—Edgar W. Geoghegan
Attorney—William S. McCurry et al.

[57] ABSTRACT

An automatic transmission for an automotive vehicle having a driving engine with a throttle, and comprising a variable speed ratio hydromechanical power transmission connecting an engine-driven input shaft and a wheel-driving output shaft including a hydrostatic unit of a pump and a motor having swash plates movable to provide infinitely variable speed ratios of the shafts and a mechanical unit in the form of a friction clutch operable to directly couple the shafts. Hydraulic control means are provided for displacing the swash plates and operating the clutch in response to vehicle speed, throttle operation, and hydraulic motor swash plate angular displacement.

17 Claims, 22 Drawing Figures

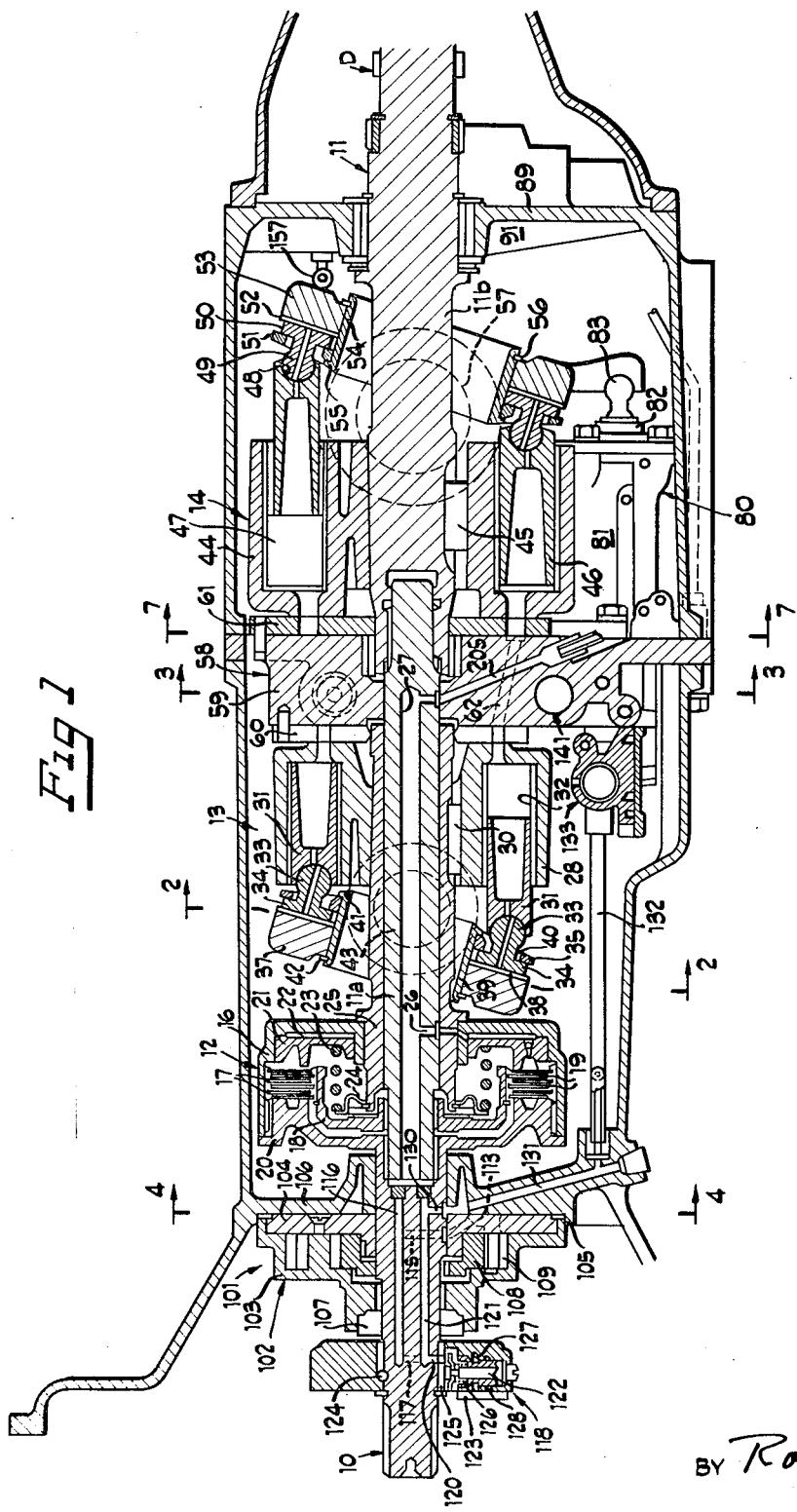

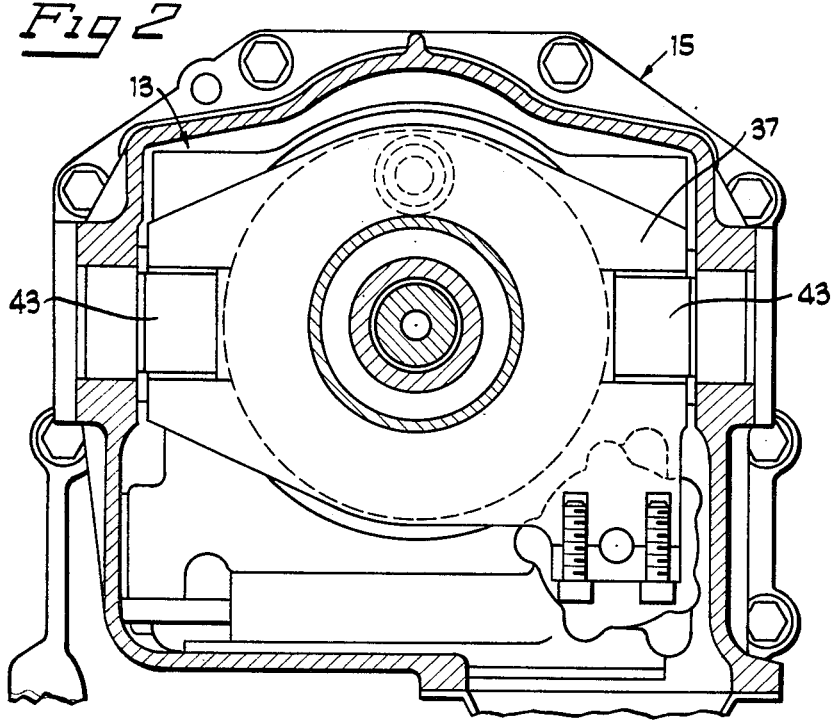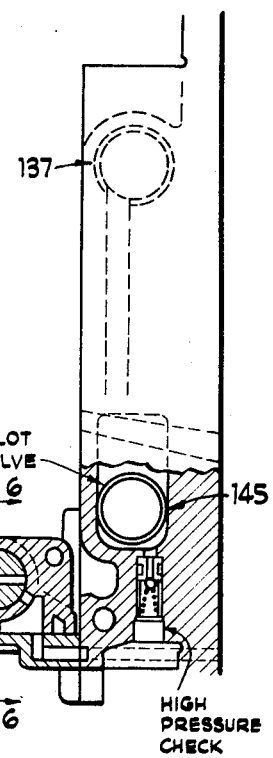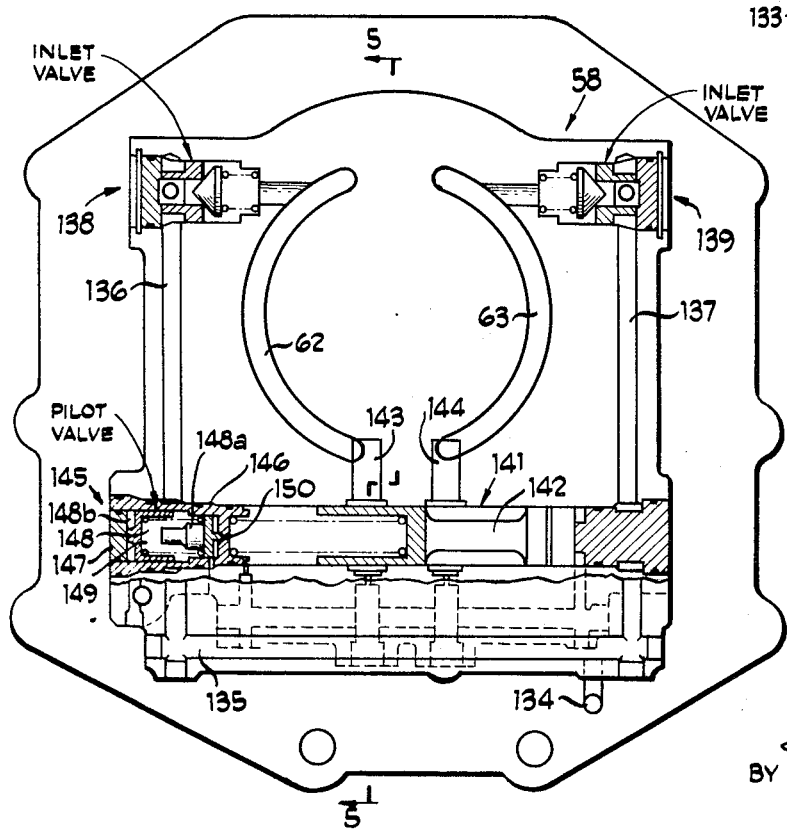

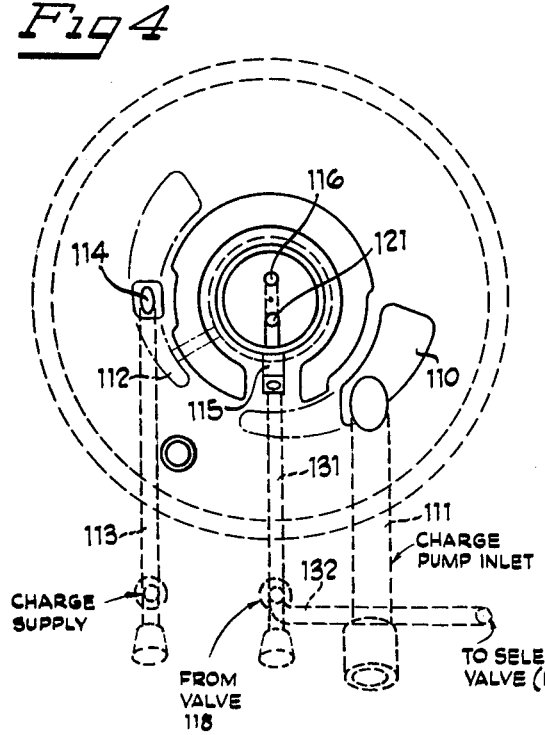
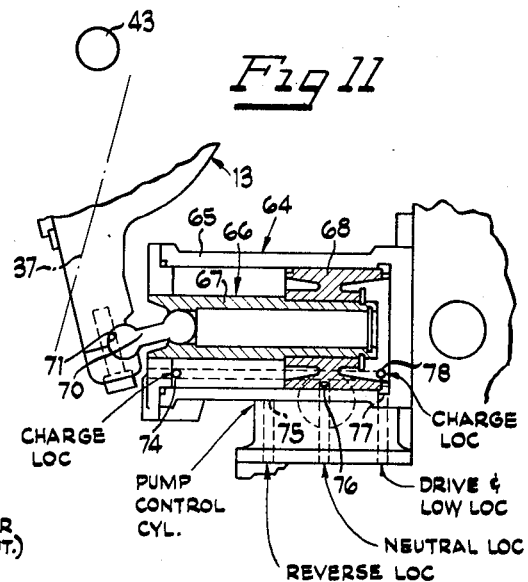
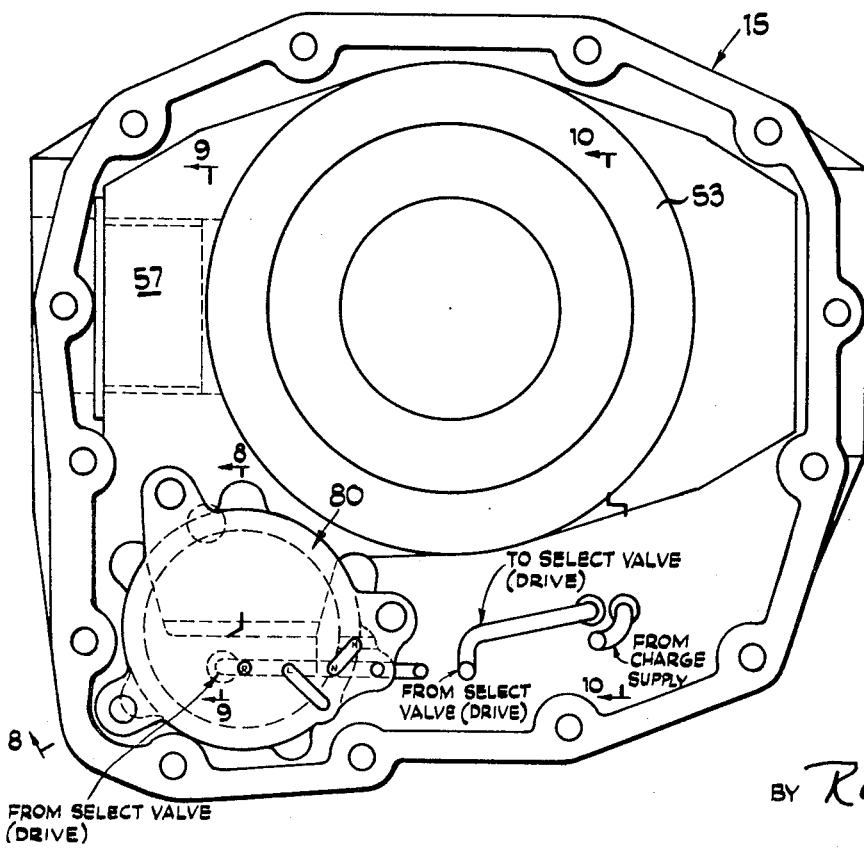

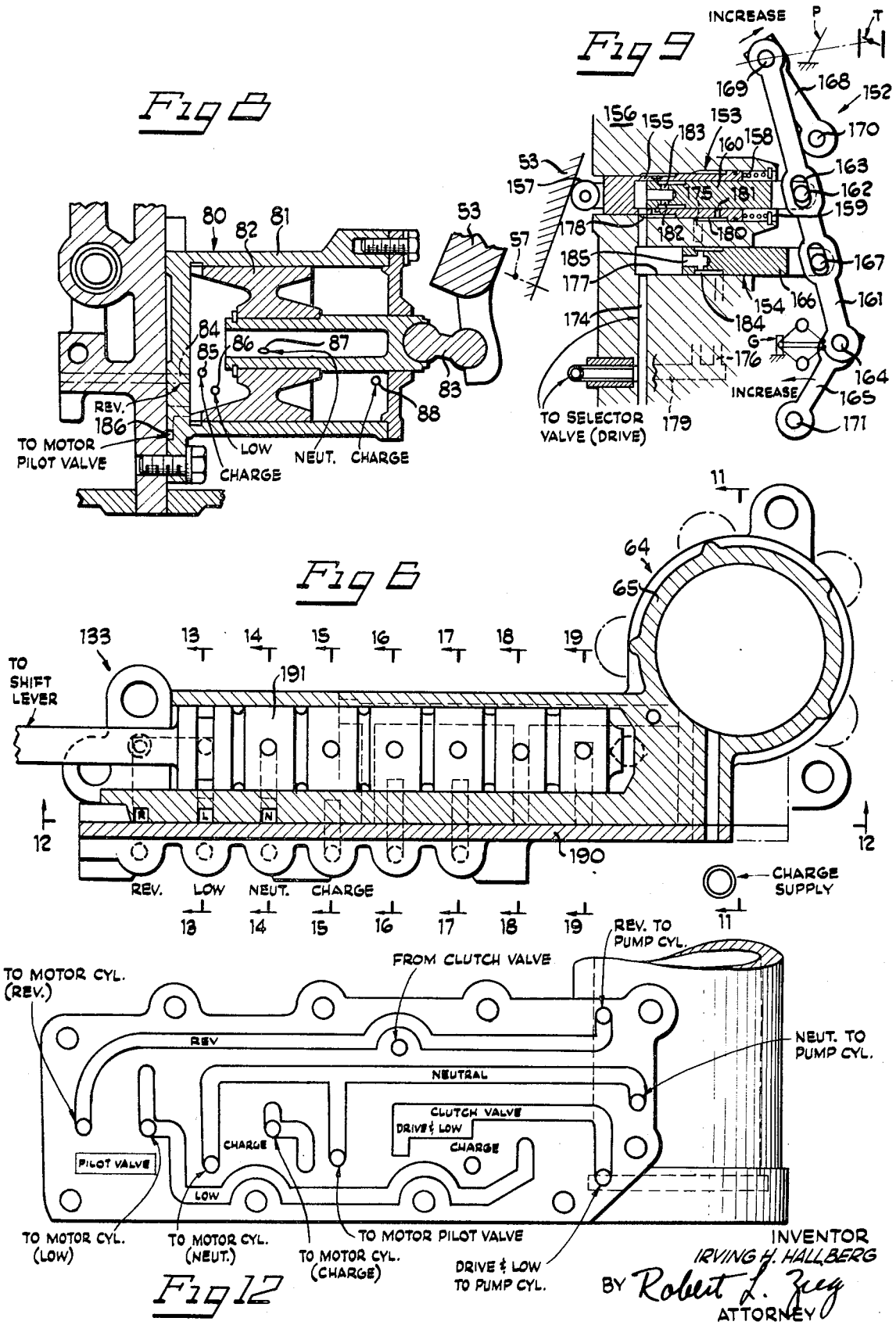

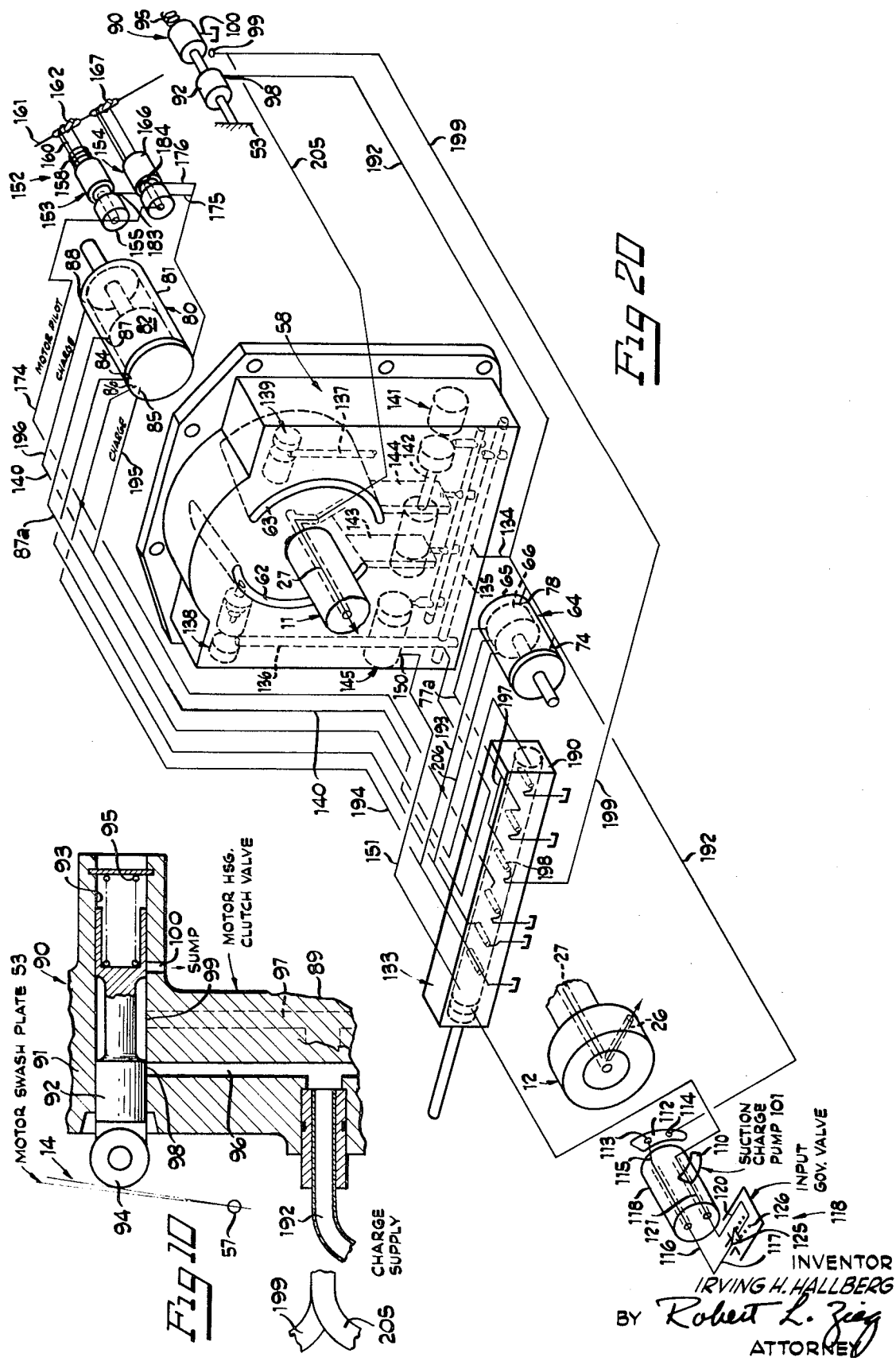

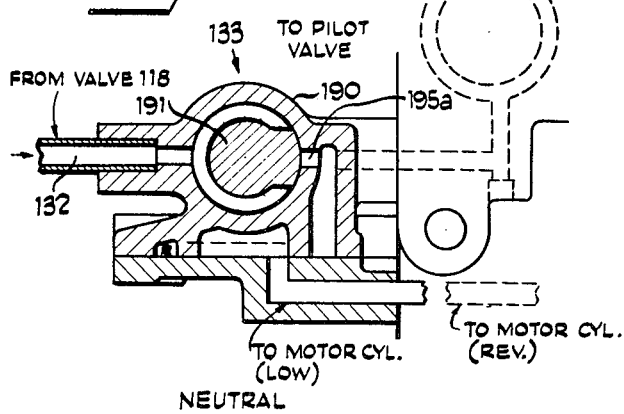
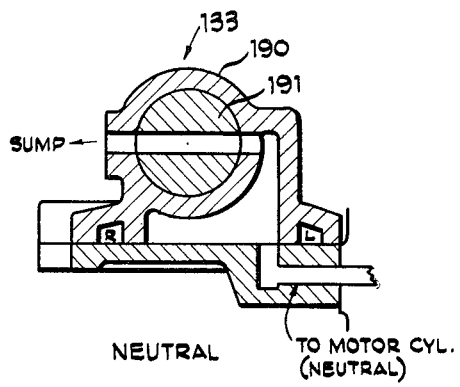
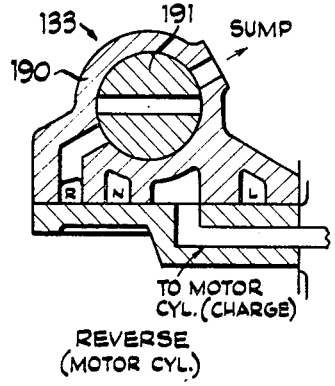
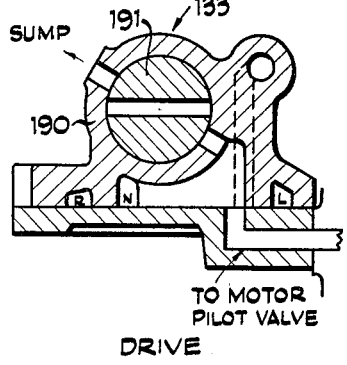
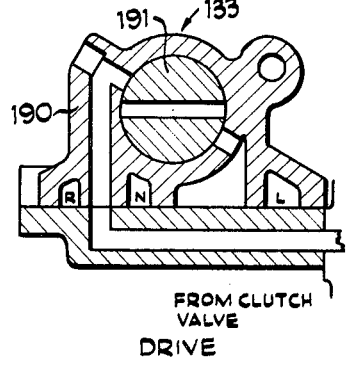
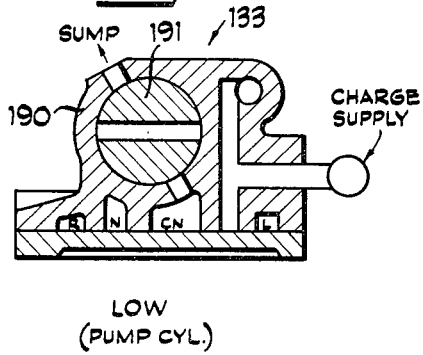
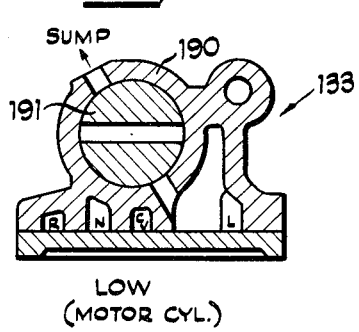
INVENTOR
IRVING H. HALLBERG

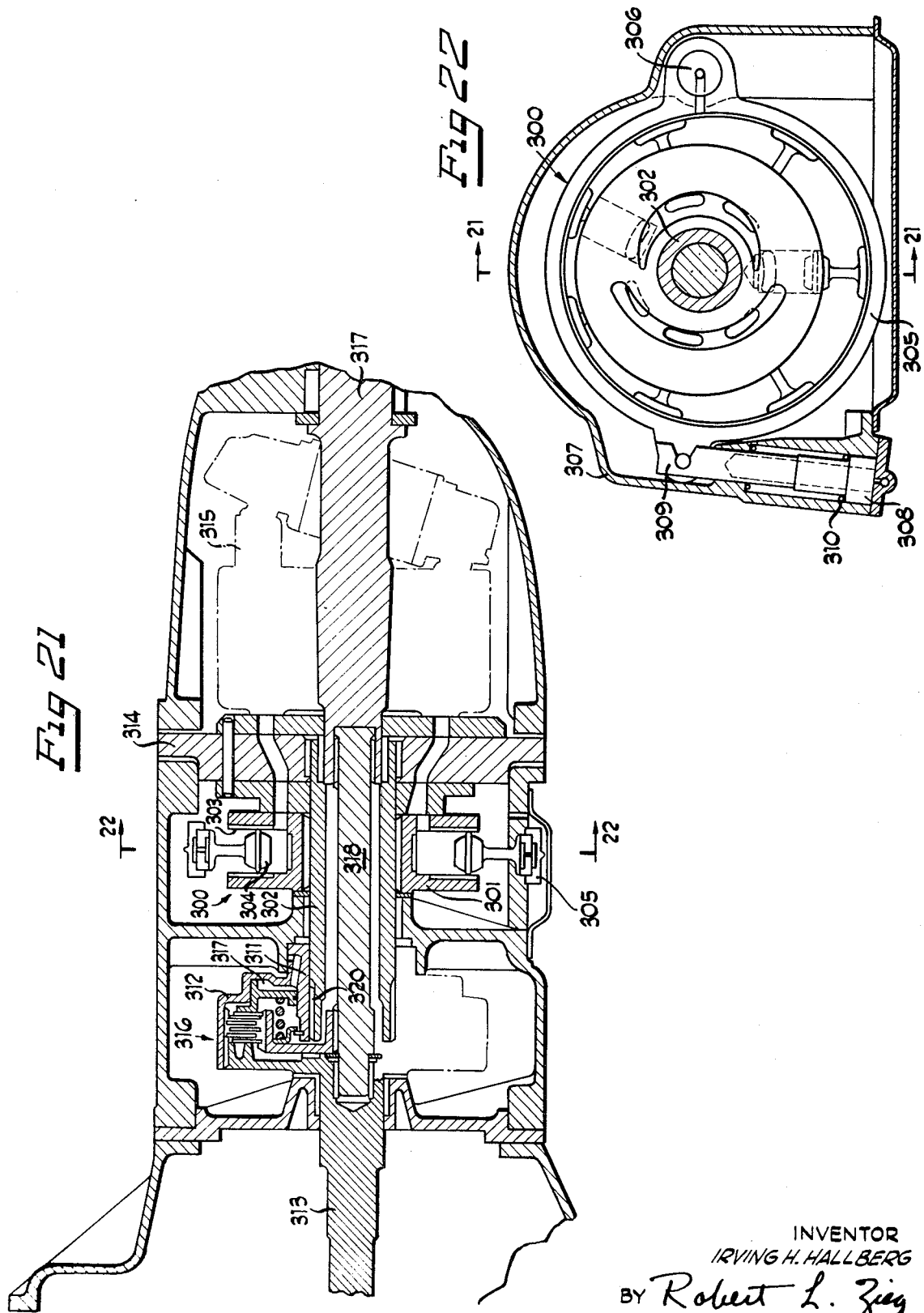

AUTOMATIC TRANSMISSION CONTROL SYSTEM

BACKGROUND AND SUMMARY OF THE INVENTION

This invention relates to an improved control system for automatic transmissions and more particularly for such transmissions of the variable speed ratio hydromechanical power types.

Automatic transmissions for automotive vehicles now commonly used are the hydrokinetic type and hydromechanical type. The hydrokinetic type usually have split power paths in which power is transmitted simultaneously hydraulically, by a hydraulic torque converter, and mechanically, by gear sets, the power portion being always transmitted hydraulically and causing noises and power losses, and the necessary stepped ratio changes provided by the gear sets, to handle changes in load, also having controls, of complex forms, for the many rotating components of the transmission. Hydromechanical type automatic transmissions, such as shown in U.S. Pat. No. 1,762,534, employ a hydrostatic pump and motor unit to provide an infinitely variable speed ratio drive train, and a friction clutch automatically operative to provide direct drive upon the swash plates of the pump and motor having substantially zero displacement. However, as no provision has been made for controlling this type transmission for automatically varying the speed ratios in response to vehicle load changes without overloading the engine, such hydromechanical transmissions have not been entirely satisfactory.

The present invention is directed to improved controls for transmissions of the hydromechanical type transmitting power either totally mechanically or hydraulically, the controls being operative to provide for automatic selection of the proper speed ratio for the hydraulic drive train for vehicle acceleration and deceleration in response to vehicle load changing requirements, and also to provide for automatic operation of a friction clutch of the transmission's mechanical direct drive train in response to throttle operation by the accelerator pedal and to speed changes of the output shaft. Since the hydraulic drive train pump and motor are at zero displacement during cruising conditions, noises and power losses are minimized.

An object of the present invention is to provide an improved control system for automatic transmissions of the variable speed ratio hydromechanical power type.

Another object of the invention is to provide an improved control system for an automatic transmission of an automotive vehicle having an engine provided with a throttle, the transmission including hydrostatic pump and motor units adapted to afford infinitely variable speed ratios by having the motor swash plate actuatable to different angular displacements by the piston of an hydraulic servomotor being movable in response to varying fluid pressures controlled by actuation of the throttle and speed of the vehicle.

Another object of the invention is to provide an improved control system for a transmission of an automotive vehicle having a throttle-controlled engine, the transmission being of the hydrostatic pump and motor type and in which the motor swash plate is movable to provide infinitely varying speed ratios by a piston of an hydraulic servomotor having pressure fluid on its opposite sides to actuate the piston, variations of the pressure fluid to move the piston being provided in response to cumulative throttle movement and vehicle speed action to control flow of pressure fluid through a servomotor exhaust port of the servomotor at one side of the piston.

Another object of the invention is to provide a control system for a transmission of an automotive vehicle having a throttle-controlled engine and of the hydrostatic pump and motor type and in which the motor swash plate movement is regulated by the piston of an hydraulic servomotor movable by pressure fluid under the influence of a valve controlled by throttle movement, vehicle speed, and the motor swash plate position.

Another object of the invention is to provide a control system for a transmission of an automotive vehicle having a throttle-controlled engine and of the hydromechanical type including a hydrostatic pump and motor combination of the swash plate type to provide an infinitely variable speed ratio power train, and a mechanical fluid pressure-operated friction clutch for connecting the engine to the vehicle wheels to provide a direct drive power train, an hydraulic servomotor for operating the clutch, a valve for controlling pressure fluid to the servomotor to engage the clutch and operative by the motor swash plate disposition at the time when the motor displacement reaches a point where it is equal to the pump displacement, the motor swash plate displacement having a control decreasing the motor plate displacement at a rate proportional to the combination of the throttle and vehicle speed at a speed determined by the combination.

DESCRIPTION OF THE DRAWINGS

FIG. 1 is a longitudinal vertical sectional view of my improved variable speed transmission and control system;

FIG. 2 is a sectional view taken along line 2—2 of FIG. 1;

FIG. 3 is a sectional view taken along line 3—3 of FIG. 1 and illustrating the relief valve arrangement of the main hydraulic circuit of the control system;

FIG. 4 is a sectional view taken along line 4—4 of FIG. 1;

FIG. 5 is a sectional view taken along line 5—5 of FIG. 3 and including a selector valve for the control valve arrangement of the control system;

FIG. 6 is a longitudinal sectional view of the selector valve of FIG. 5, taken along line 6—6 of FIG. 5;

FIG. 7 is a sectional view taken along line 7—7 of FIG. 1;

FIG. 8 is a sectional view taken along line 8—8 of FIG. 7;

FIG. 9 is a sectional view taken along line 9—9 of FIG. 7;

FIG. 10 is a sectional view taken along line 10—10 of FIG. 7;

FIG. 11 is a sectional view taken along line 11—11 of FIG. 6;

FIG. 12 is a sectional view taken along line 12—12 of FIG. 6;

FIGS. 13 - 19 are detail views of the selector valve illustrating the positions of the valve to establish the neutral, drive, low and reverse conditions of the transmission;

FIG. 20 is a schematic diagrammatic illustration of the control system;

FIG. 21 is a longitudinal vertical sectional view of a modification of the variable speed transmission;

FIG. 22 is a cross-sectional view of the transmission shown in FIG. 21, taken on line 22—22 of FIG. 21.

DESCRIPTION OF THE PREFERRED EMBODIMENT

Referring to the drawings and more particularly to FIG. 1, there is shown a transmission comprising a drive shaft 10; a driven shaft 11 having a front section 11a and a rear section 11b splined to each other for unitary rotation, the section 11a being journaled in the end of drive shaft 10; a friction clutch 12 for directly connecting the shafts 10 and 11, and a hydrostatic drive assembly providing a variable speed drive between shafts 10 and 11 and including a fluid pump 13 of the axial piston type and a fluid motor 14 of the axial piston type. These transmission components are mounted in a stationary case or casing 15.

The friction clutch 12 comprises an outer cylindrical drum or shell 16 having depending therefrom and splined thereto for axial movement a plurality of friction discs 17, and a cylindrical inner drum or shell 18 having splined thereto a plurality of friction discs 19, the friction discs being provided with suitable friction facings. A fixed annular backing or pressure plate 20 is formed on one end of the drive shaft 10 and is splined to the drum 16. The inner drum 18 is splined to the front section 11a of the driven shaft 11 to rotate the shaft 11 upon engagement of the clutch discs by an axially movable pressure plate 21 of the clutch 12. The friction discs 17 and 19 are interleaved and sandwiched between the pressure plate 20 and the annular pressure plate 21 slidably disposed in an annular cavity 22 of the drum 16. The pressure plate 21 is normally held in its retracted clutch-disengaging position by a coil spring 23 having one end seated on plate 21 and its other end engaging an annular stop 24 on a rotatable sleeve shaft 25 surrounding driven shaft section 11a. The pressure plate 21 and drum 16 provide a hydraulic servomotor. When fluid under pressure flows into the cavity 22 of drum 16 from a passageway 26, provided by aligned openings in the drum 16 and shafts 25 and 11, and an axial passage 27 in shaft 11, the pressure plate 21 is moved to engage the clutch discs 17 and 19 to directly connect the drive and driven shafts 10 and 11.

The axial piston pump 13 includes a rotary cylinder block 28 surrounding the sleeve shaft 25 and splined or keyed at 30 to the shaft so that the cylinder block rotates with the shaft 25. Pistons 31 are slidably mounted in cylinders 32 formed within the cylinder block 28 parallel to the axis of rotation of the shaft 11 and equally spaced from one another in a concentric annular series. The left ends of the pistons have partially spherical seats therein for retention of spherical heads 33 on shoes 34 extending through openings 40 in an annular disc 35 into the pistons while allowing pivotal movement of the shoes relative to the pistons. A cylindrical support 39 is provided for the disc 35; and also an annular face plate 38 disposed between and engaging the plate 37 and disc 35. The swash plate 37, disc 35, and plate 38 are retained on the support 39 by a radially outward extending flange 41 on one end of the support and engaging the disc 35, and by a retaining ring 42 received within a slot in the support 39 and engaging the swash plate 37. As shown in FIG. 2, the swash plate is provided with trunnions 43 for supporting the plate and for pivotally connecting the swash plate to the casing 15. The swash plate is adjustable to vary the displacement of the pump in well-known manner.

The axial piston motor 14 is mounted within the casing 15. The motor cylinder block 44 drives driven shaft 11 through the keyed connection 45 between the block and shaft section 11b. Motor pistons 46 are slidably mounted in cylinders 47 in the motor cylinder block 44 and have partially spherical seats 48 receiving and retaining the spherical heads 49 of the shoes 50, the heads 49 extending through openings in an annular disc 51. A face plate 52 is positioned between shoes 50 and a swash plate 53; the face plate 52 and disc 51 being held in position on a cylindrical support 54 by a flange 55 on the support and a retaining ring 56. The swash plate 53 is provided with trunnions 57 for pivotally connecting the swash plate to the casing 15. The swash plate is adjustable to vary the displacement of the motor and thereby the speed of rotation of the driven shaft 11.

The hydraulic pump 13 and motor 14 are separated by a partition or wall 58, fixed to the casing 15 and providing a stationary port and valve block 59 having fluid inlet and outlet plates 60 and 61 attached to opposite sides thereof. As seen in FIGS. 1, 3 and 20, the block 59 has two fluid passages 62 and 63 interconnecting the pump and motor. Depending on the direction of rotation of the engine and whether the engine is driving the wheels through the output shaft or the wheels are attempting to drive the engine in a coast condition, one of the passages 62 or 63 will be a high pressure passage, carrying fluid under pressure from the pump to the motor and the other will be a low pressure passage returning low pressure fluid from the motor to the pump.

Referring to FIG. 11, the swash plate 37 of the pump 13 is rotatable on its trunnions 43 by an hydraulic control unit 64 to control the angular position of the plate and thereby the variable speed ratio and reverse drives of the transmission, and neutral. The control unit 64 comprises a cylinder 65 having a piston 66 reciprocal therein and connected to the swash plate 37. The piston 66 has a cylindrical stem 67 with its closed end extending through and connected to a hollow piston head 68 and its open end receiving and pivotally engaging one of the ball ends of a connecting rod 70. The other ball end of the rod 70 is positioned within a spherical socket 71 in the swash plate 37. The cylinder 65 is provided with control ports 74, 75, 76, 77 and 78 and fluid pressure, supplied selectively to the ports, will function to maintain piston 66 as shown or to move the piston to various positions, and thereby swash plate 37, to obtain neutral, variable forward speed ratio drives, or reverse drive of the transmission as will be later described.

Referring to FIGS. 1, 8 and 20, the fluid motor 14 has its swash plate 53 pivotally movable by an hydraulic control unit 80 having a cylinder 81 and piston 82 reciprocal therein. A connecting rod 83 has one of its ball ends pivoted to the stem of the piston and its other ball end pivoted to the swash plate 53 so that movement of the piston is effective to position the swash plate to obtain neutral, forward speed ratio or reverse drives. To control the piston for this purpose, the cylinder 81 is provided with control ports 84, 85, 86, 87 and 88.

Upon initiation of operation of the hydrostatic drive assembly of the transmission, the swash plate 37 of the pump 13 is tilted slightly causing pressure to develop in the motor 14 with the swash plate 53 of the motor tilted to its extreme tilted position shown in FIG. 1, the pistons 46 will make their maximum or full stroke in the cylinders 47. With the swash plate 37 tilted only slightly, pistons 31 of the pump are operated through short strokes in the cylinders 32 and, accordingly, the fluid pumped by the pump 13 operates the motor 14 at a speed considerably less than the speed at which the pump is driven. As the angularity or tilt of the plate 37 is increased, the motor 14 increases in speed until the plates 37 and 53 are tilted to predetermined degrees which results in equal displacements, at which time the pump and motor, thereby the drive and driven shafts 10 and 11, operate at the same speed. At this time, the friction clutch 12 is automatically engaged to directly connect the drive shaft 10 and driven shaft 11. More particularly, and referring to FIGS. 1, 10 and 20, the transmission casing 15 has its rear wall 89 containing a clutch control valve assembly 90 comprising a housing 91, a valve spool 92 reciprocal in a cylindrical chamber 93 in the housing. The valve spool 92 has a bifurcated end portion rotatably supporting a roller 94 urged into engagement with the swash plate 53 of the motor 14 by a spring 95 seated against the housing 91 and biasing the spool toward the plate. The housing 91 is provided with fluid passages 96, 97 communicating, by ports 98 and 99, with chamber 93. The passage 96 is connected to a source of fluid under pressure and the passage 97 is connected to piston-containing cavity 22 of clutch drum 16, via passages 205, 26 and 27 (FIG. 1). During variable speed ratio drive by the hydrostatic drive assembly, the spool 92 and swash plate 53 have positions similar to that shown in FIG. 10 with the swash plate 53 holding the spool 92 to block port 98 and thereby flow of pressure fluid in passage 96 to chamber 93 and passage 97 to the clutch. When the swash plate 53 moves counterclockwise and reaches a predetermined angle wherein the pump and motor fluid displacements are equal, the spring 95 moves spool 92 to uncover port 98 for flow of pressure fluid from passage 96 into the chamber 93 and passage 97 to the clutch hydraulic servomotor to engage the clutch. When the swash plate 53 rotates clockwise to establish variable speed ratio drive, the spool 92 closes port 98 and pressure fluid will drain from the clutch servomotor to port 100 in housing 91 and to the transmission sump.

A fluid pressure charge pump 101 supplies fluid under constant pressure by a control circuit to the pump control servomotor 64 operating the swash plate 37 of the pump 13 and also to the servomotor 80 operating the swash plate 53 of the motor 14. Referring to FIGS. 1, 4 and 20, the charge pump 101 is a gear or gerotor conventional fixed displacement pump and comprises a housing 102 provided by an annular drum 103 surrounding the drive shaft 10 and an annular plate 104 within the drum and secured to the drum by bolts, as shown. The rim of drum 103 is enclosed by and fixed to a circular flange 105 of the front wall 106 of the transmission casing 15. A seal assembly 107 is disposed between the drum 103 and shaft 10 to prevent leakage of fluid from the pump 101. The pump has its inner rotor 108 keyed to the drive shaft, and its outer rotor 109 rotatable in the housing 102 and having recesses adapted to receive teeth on the inner rotor so that, upon rotation of the drive shaft, the pump 101 causes fluid to enter the inlet 110 of the pump 101 from passage 111 connected to the sump and to provide fluid under pressure to pump outlet 112 and to passages 113 and 114 in plate 104. Passage 113 communicates with a cylindrical groove in drive shaft 10 and thereby with a radial passage 115 of shaft 10 connected to axially extending passage 116 of shaft 10. The passage 115 directs the pressure fluid, through passage 116 in shaft 10, to another radial passage 117 in shaft 10 to a centrifugally-operated valve 118, responsive to a predetermined speed of the drive shaft 10 (e.g., 600 R.P.M.), which connects radial passage 117 to passages 120 and 121 in shaft 10.

The valve 118 is of well-known design and constitutes a piston 122 movably disposed in a casing 123 which is attached to the drive shaft 10 for rotation therewith such as by a ball 124 disposed in a splineway formed in the casing 123. The piston 122 has its weighted head 125 urged radially inwardly of the shaft 10 by a spring 126 seated on the casing and engaging the piston head. As shown in FIG. 1, the casing is provided with ports 127 and 128 respectively connected to the passage 117 and 120, and the piston 122 blocks pressure fluid in passage 117 flowing into port 128 and passage 120. Upon the attainment of sufficient speed of rotation of the drive shaft 10, the piston will move in a direction radially outward of shaft 10 to connect the passages 117 and 120. Pressure fluid will flow through valve 118, passages 120 and 121 to a radial passage 130 connected by a cylindrical groove in shaft 10, to a passage 131 in wall 106 to a tube 132 to a selector valve 133.

Referring to FIG. 20, the fluid pressure discharge port 114 of pump 101 is connected by suitable conduits to valve 133, to charge ports 74 and 78 of the pump control hydraulic unit 64, to passages 134, 135, 136 and 137 in the casing partition 58, to the spring-closed inlet check valves 138 and 139 (FIGS. 3 and 5), to port 98 of clutch control housing 91 (FIG. 10). In addition, pressure fluid is conducted from passage 135 to conductor 140 and to ports 85 and 88 of the motor control hydraulic unit 80.

A pressure relief valve assembly of the pilot-operated type is provided to prevent pressures beyond a desired limit from being developed in the transmission. For this purpose, the relief valve assembly is connected in such a manner to the pressure ports interconnecting the fluid pump and motor so that the valve assembly limits the pressure developed regardless of which of the ports is the high pressure port. The valve assembly will be only briefly referred to herein as it is shown and described in U.S. Pat. No. 3,143,858 issued Aug. 11, 1964, to which reference should be made for a complete disclosure. Referring to FIGS. 1, 3 and 20, the valve assembly is mounted in the partition 58 between pump 13 and motor 14. The partition 58 has the passages 62 and 63 and, depending upon the direction of rotation of the motor 14 and whether the engine is driving the wheels through the output shaft 11 or the wheels are attempting to drive the engine in a coast condition, one of the passages 62 or 63 will be a high pressure passage, carrying fluid under pressure from the pump to the motor and the other will be a low pressure passage returning low pressure fluid from the motor to the pump. The lower portion of the partition 58 has a bore therein receiving the valve spool 142 of the relief valve assembly 141. Passages 143 and 144 communicate fluid from passages 62 and 63 to the relief valve assembly.

A pilot valve 145, operating the relief valve assembly 141, is provided in the left-hand end of the bore in partition 58 and comprises a housing 146, an end plug 147, a movable member 148, a valve 148a, and a spring 149 urging the valve to the right to control a port 150. With the movable member 148 at the extreme left position, the valve 148a is unseated by very low pressure preventing a pressure build-up in the main circuit. When control pump 118 pressure is admitted to the cavity 148b, the member 148 moves to the right increasing the force of spring 149 on the valve 148a which increases the pressure of the system to the rated value.

Referring now to FIGS. 9 and 20, a valve assembly 152 is provided for controlling the infinitely variable speed ratios of the transmission and comprising motor pilot valves 153 and 154 under the control of the vehicle engine throttle T by movement of an accelerator pedal P, and a governor G rotatable by a gear D on driven shaft 11 and responsive to variations in the speed of the driven shaft. More particularly, the valve assembly 152 is located in the transmission casing adjacent to the motor swash plate 53, as shown in FIGS. 1 and 9. Valve 153 comprises a hollow piston 155 reciprocally mounted in a bore in a housing 156 and having a cylindrical body portion and a head portion. The head portion of piston 155 is forked to rotatably support a roller 157 engaging swash plate 53 so that movement and position of the plate 53 is sensed by the valve 153. The roller of piston 155 is urged into engagement with the plate 53 by a spring 158 engaging the end of the piston and seated on a retaining ring 159 in a groove in the inner cylindrical surface of the housing. A piston 160 is movable in the cylindrical body of piston 155 and has its outer end connected to a floating link 161 by a pin 162 in a slot 163 in the link. The link 161 has its lower end pivotally connected by pin 164 to a link 165. The valve 154 comprises a piston 166 reciprocal in a bore in housing 156 and located parallel to pistons 155 and 160. The piston 166 is connected by a pin 167 to link 161 so that movement of the piston 166 is also controlled by the link 161.

The control link 161 has its upper slotted end connected to one end of a link 168 by a pin 169 fixed to the link 168, the other end of link 168 being rotatable about a shaft 170 mounted in the housing 156. The link 168 is rotated with the accelerator pedal P for operating link 161 during pedal movement to control the transmission shift with respect to the engine throttle position. The lower end of link 165 is connected to a rod 171. The lower end of link 161 and the upper end of link 165 are connected to each other and to a centrifugal-weighted governor G connected to and responsive to the speed of the output shaft 11. It will be apparent that movement of the pistons 160 and 166 will be controlled by the summing movement of link 161 in response to accelerator pedal actuation and driven shaft speed.

The valves 153 and 154 control fluid pressure actuation of the hydraulic control unit 80 operating the motor swash plate 53. More particularly, the valve housing 156 is provided with fluid passages 174, 175 and 176, passage 174 communicating with a port 177 in the left end of the bore for piston 166 and also with a port 178 in the cylindrical bore for piston 155; passages 175 and 176 terminating in a passage 179 connected to port 186 in motor control 80. Valve housing 156 has an annular groove 180 in its inner cylindrical face connected to port 175 and communicating with a port 181 in slidable piston 155. Port 178 communicates with the interior of cylindrical piston 155 and also with the hollow end of piston 160 leading to a transverse passage 182 which connects to annular groove 183 of piston 160. When piston 160 is moved to the right (FIG. 9), fluid flow is established via passage 179, passage 175 to groove 180 in housing 156 and to port 181 in piston 155 to groove 183 and passage 182 in piston 160, port 178, cylindrical bore for piston 166, port 177 to passage 174 to the selector valve. In the position of piston 166 in FIG. 9, the passage 176 connects to and conducts fluid to annular groove 184 and passage 185 in piston 166 and to port 177 and passage 174 in the valve housing to the selector valve. The passage 179 connects to a passage 186 in the body of the servomotor 80 actuating the swash plate 53.

The selector valve 133 is shown in FIGS. 6 and 20, with FIGS. 13 to 19, inclusive, providing different sectional views thereof to illustrate the "NEUTRAL" position of the valve. The sectional views show the neutral ports, "REVERSE" ports (FIG. 15), "DRIVE" ports, (FIGS. 16 and 17), and "LOW" ports (FIGS. 18 and 19). More particularly, the selector valve is of the rotary type having a cylindrical housing 190 receiving a spool 191 rotatable to the various positions of FIGS. 13–19 to provide the designated drives and neutral by a manually-operable shift lever as shown in FIG. 20.

Control of the identified transmission components by the selector valve 133 will best be understood from a description of the operation of the transmission with particular reference to the drawings and particularly FIG. 20 schematically illustrating the transmission components and hydraulic servomotors therefor as controlled by the various valve arrangements including the selector valve 133 and accelerator and speed responsive valves 153 and 154.

In the "NEUTRAL" condition of the transmission, the selector valve 133 is in the position shown in FIGS. 6, with sections shown in FIGS. 13 to 19. At this time, the automotive engine operation causes the charge pump 101 to provide fluid under pressure through conduit 192 to branch ports 74 and 78 to both sides of the hydraulic control piston 66 for the swash plate 37 of pump 13 and also to branch ports 85 and 88 to both sides of the hydraulic control piston 82 for the swash plate 53 of the motor 14 and to port 98 of clutch valve 90, and to inlet valves 138 and 139. It will be noted that both control pistons are differential sized to provide unbalanced forces. Also, a conduit 193 connects bleed port 76 in the wall of the pump control cylinder to drain to the sump through the selector valve from conduit 194. When fluid leaves the pump control piston 66, the piston stays (hovers) in the neutral position in which it is "hydraulically locked." The reason for "hydraulic locking" is that pressure on the large area of the piston drops so that the forces on both ends of the piston are balanced. Fluid under pressure from the manifold of the valve block passes through conduit 140 to ports 85 and 88 on both sides of the motor control piston 82 through branch conduits 195 and 196. Fluid under pressure, flowing from port 87, also passes through conduit 193 to a neutral port of the selector valve 133 to drain. In conduit 151, the centrifugal valve 118 also blocks pressure fluid from the charge pump to the selector valve until engine speeds in excess of 600 R.P.M. occur. The spool 191 of the valve 133 is effective to prevent flow of fluid under pressure from the charge pump to port 195a of the valve (FIGS. 13 and 20) and thereby conduit 151 to the pilot valve 145 so that pressure is not built up in the main high pressure circuits of the variable ratio pump and motor. Accordingly, since no fluid under pressure is generated in these main circuits, no power is transmitted from the drive shaft 10 to the driven shaft 11. The pump and motor swash plates are also at zero displacement positions.

In the "LOW" speed ratio of the transmission, the spool of the selector valve 133 is rotated to its "LOW" position (see FIGS. 18 and 19). At this time, and referring to FIG. 20, fluid under pressure from the charge pump 101 flows through conduits 192 and 140 to both sides of the pump and motor control pistons 66 and 82, as in the described "NEUTRAL" condition. Referring to the pump control piston and cylinder, the fluid flows from port 77 of the pump control through conduit 77a to the "LOW" port in the selector valve to drain. Fluid also flows from the motor control cylinder 81 through port 86 and a conduit 87a to another "LOW" port in the selector valve to drain. At this time, "NEUTRAL" port 195a of the selector valve connects the fluid under pressure via conduit 151 to the port 150 on the backside of the pilot valve seating the pilot valve to allow the pump and motor power generating system to operate with fluid under high pressure. Accordingly, both swash plates of the pump and motor are at maximum displacement providing high torque output from the transmission to the road wheels. No variation in "LOW" speed ratio (about 2:1) occurs in this transmission condition. It may be noted that the centrifugal valve 118 operates in the same manner, as in the "NEUTRAL" condition. Similarly, if the engine idles, as in "NEUTRAL," system high pressure is not generated by the pump to cause " creeping" of the auto.

In the "DRIVE" condition of the transmission, an initial variable speed ratio hydraulic drive is provided by the pump 13 and motor 14, and a direct drive is provided by the mechanical clutch 12 directly coupling the drive and driven shafts 10 and 11. In both of these drives, the charge pump 101 is effective to provide fluid under pressure to the pilot valve 145, and the centrifugal valve 118 operates to control the fluid in the same manner as in the "NEUTRAL" condition.

To establish the variable speed ratio hydraulic drive, the spool of the manual selector valve 133 is rotated from positions shown in FIG. 16 to a position where the passage in spool 191 connects to the sump port to establish the "DRIVE" position. Fluid under pressure from the charge pump is still connected to both sides of the pump and motor control cylinders 65 and 81. From cylinder 65, the fluid is connected through port 77 and conduit 77a to conduit 197 and through "DRIVE" port 198 of the selector valve, through conduit 199 to port 99 of the clutch valve 90 to its drain 100. Referring to FIGS. 9 and 20, to control the swash plate 53 of the motor 14, fluid from the cylinder 81 flows through conduit 174 from port 184 or 183, depending on conditions, to drain through the selector valve. Fluid flow through conduit 179 from port 184 occurs during engine idling caused by low throttle and low output speed, spool 166 of motor pilot valve 154 moving its port 184 relative to port 176 of cylinder 177 of the valve. Fluid flow occurs, during wide-open throttle and low speed to provide a downshift for passing another vehicle, through conduit 174 from port 183 of movable cylindrical spool 160 of pilot valve 153, spool 160 moving inside spool 155 of the valve to determine the operating positions of port 183 with reference to port 181 of spool 155. Since the roller 157 of spool 155 rides on the motor swash plate, the spool 155 senses the plate's position. It may be noted that piston 82 of the motor swash plate control servomotor 80 and spool 155 have the same motion as they are both connected to the swash plate. As previously described, the positions of the pilot valves 153 and 154 are controlled by the floating link 161 controlled by the action of the throttle-operating accelerator pedal and the output speed governor in a summing operation to provide infinitely variable speed ratios as determined by different accelerator pedal and governor positions.

To provide mechanical direct drive of the transmission, the friction clutch 12 is engaged to connect the drive and driven shafts 10 and 11. In the automatic operation of the transmission, the clutch is engaged when the pump and motor swash plates 37 and 53 are tilted to predetermined angular positions such, for example, about 6° for the motor swash plate and about 20° for the pump swash plate, in which the motor displacement is equal to the pump displacement thereby providing a direct drive ratio. Upon the occurrence of this condition, the clutch valve 90 (FIGS. 10 and 20) is operated by the motor swash plate and switches port 99 of valve 90 to connect it to port 98 (pressure) and disconnects it from port 100 (drain) of valve 90. When the connection of port 99 with port 98 is established, pressure from the charge pump flows through the conduit 205 to conduit 27 in shaft 11a and to port 26 of the clutch servomotor to operate piston 21 to engage the clutch plates 17 and 19 for connecting drive shaft 10 and shaft 11a and thereby shaft 11. It will be apparent that clutch engagement can occur at different vehicle speeds dependent on the accelerator and output governor positions. Also, when the clutch is engaged and direct drive 1:1 ratio exists, the swash plates 37 and 53 will be in the aforesaid angular positions and thereafter will move to neutral positions in which they have zero stroke — rotating, but not pumping or driving and not transmitting any power — because there is no longer any draining at the "DRIVE" ports but only at the "NEUTRAL" ports, namely, neutral ports 87 and 76 of motor and pump control cylinders 65 and 81 through conduit 193 to drain.

To provide "REVERSE" drive, the manual selector valve 133 (FIG. 15) is rotated to a position to connect the passage in valve 191 to sump. The same conditions exist as previously explained with reference to the establishment of "LOW" speed drive, except the fluid under pressure from the charge pump flows to the sump through the reverse ports in the selector valve. The charge pump pressure continues to flow to both ends of the cylinders of the pump and motor controls 64 and 80 as in the "NEUTRAL" and "LOW" conditions, and then to conduit 206 to sump. In this respect, it is noted that the pump swash plate is movable to one side of the "NEUTRAL" position to get forward drive, while it is movable to the other side of this position to obtain "REVERSE" drive.

FIGS. 21 and 22 illustrate a modification of the transmission of FIG. 1 and in which a variable displacement pump 300 is provided having a cylindrical housing 301, keyed to a sleeve shaft 302, with a plurality of circumferentially disposed radial rotary cylinders 303 opening outwardly. Pistons 304 are positioned in cylinders 303 and cooperate with an outer annular pivotal member 305 disposed in eccentric relation to the axis of the cylinder housing. The outer member 305 is eccentrically and rotatably movable about a fixed pivot pin 306 on transmission casing 307 by a piston 308 hooked at 309 to the member 305 and movable in a cylinder 310 of the transmission casing. Since the shaft 302 is splined at 320 to a cylindrical sleeve 311 forming a portion of a clutch housing 312 connected to the drive shaft 313, the housing 301 will rotate with the drive shaft to cause the pistons to move radially to provide fluid under pressure to a control valve plate 314 directing the fluid to a variable displacement motor 315 such as shown in FIG. 1. The friction clutch 316 is provided with the servomotor 317 to engage the clutch to directly couple the drive shaft 313 to intermediate shaft 318 and thereby to the driven shaft 317. The hydraulic control arrangement, disclosed in FIGS. 1–20, is adaptable to the transmission of FIGS. 21 and 22.

What is claimed is:

1. In an automatic transmission for an automotive vehicle having a driving engine with a throttle, the combination of an input shaft adapted to be driven by the engine, and an output shaft, an infinitely variable speed ratio hydraulic unit including a multi-cylinder hydraulic power motor drivingly connected to said output shaft and in operative relation with a first swash plate, a multi-cylinder hydraulic power pump drivingly connected to said input shaft and in operative relation with a second swash plate, said pump and motor being hydraulically interconnected through a hydraulic working circuit having a high pressure side and a low pressure side operative for hydraulically transmitting power from said input shaft to said output shaft; hydraulic control means including an hydraulic servomotor having a piston movable to displace angularly said first swash plate for selectively varying the displacement of said motor and thereby the speed ratios between said shafts, and valve means controlling movement of said pistons; actuating means connected to said valve means; and means responsive to movement of said throttle and to the speed of said vehicle for operating said actuating means.

2. In an automatic transmission as defined in claim 1 in which said hydraulic servomotor is provided with pressure fluid ports on opposite sides of the piston having relatively large and small pressure areas respectively forming movable portions of spaced first and second chambers, and with an exhaust port communicating with said first chamber, said valve means being operative to control venting of pressure fluid from said first chamber through said exhaust port to reduce pressure of the fluid in said first chamber to thereby move said piston to vary the position of said first swash plate.

3. In an automatic transmission as defined in claim 1 wherein said first swash plate is engageable with and is operable to move said valve means to positions controlling operation of said valve means by said throttle and speed responsive means.

4. In an automatic transmission as defined in claim 2 wherein said first swash plate is engageable with and is operable to move said valve means to positions controlling operation of said valve means by said throttle and speed responsive means.

5. In an automatic transmission as defined in claim 1 wherein said valve means is engageable with said first swash plate to limit the range of movement of said first swash plate by said servomotor piston by said actuating means when operated by said throttle and vehicle speed responsive means.

6. In an automatic transmission as defined in claim 1 wherein said speed responsive means includes a centrifugal governor, and said throttle responsive means includes an accelerator pedal, and means connecting said governor and said pedal to said valve means to combine the movements of said governor and said pedal to vary the position of the valve means.

7. In an automatic transmission as defined in claim 2 wherein said speed responsive means includes a centrifugal governor, and said throttle responsive means includes an accelerator pedal, and means connecting said governor and said pedal to said valve means to combine the movements of said governor and said pedal to vary the positions of the valve means.

8. In an automatic transmission as defined in claim 5 including spring means operative to maintain said valve means engaged with said first swash plate during movements of said throttle and speed responsive means.

9. In an automatic transmission as defined in claim 5 wherein said valve means includes telescoping valve members, a spring urging one of said members into engagement with said first swash plate, and means connecting the other of said members to said throttle and speed responsive means.

10. In an automatic transmission as defined in claim 1 wherein said speed responsive means includes a centrifugal governor, said throttle responsive means includes an accelerator pedal, and means connecting said governor and said pedal to said valve means to combine the movements of said governor and said pedal to vary the position of the valve means to increase the effective angular displacement of said first swash plate to a high speed ratio position, said valve means being operative by movement of said accelerator pedal to its full open throttle position to actuate said valve means to energize said servomotor to move said piston and thereby said first swash plate to increase the angular displacement of said first swash plate to a higher speed ratio position.

11. In an automatic transmission as defined in claim 2 wherein said speed responsive means includes a centrifugal governor, and said throttle responsive means includes an accelerator pedal, and means connecting said governor and said pedal to said valve means to combine the movements of said governor and said pedal to vary the positions of the valve means to increase the effective angular displacement of said first swash plate to a high speed ratio position, said valve means being operative by movement of said accelerator pedal to its full open throttle position to actuate said valve means to energize said servomotor to move said piston and thereby said first swash plate to increase the angular displacement of said first swash plate to a higher speed ratio position.

12. An automatic transmission as defined in claim 1 in which said servomotor is provided with pressure fluid ports on opposite sides of the piston having relatively large and small pressure areas respectively forming movable portions of spaced first and second chambers, and said servomotor is also provided with a plurality of exhaust ports located along the length and stroke of said piston to reduce the pressure in said first chamber and thereby on the large pressure area side of said piston to control the positions of the piston and thereby the angular displacement of said first swash plate; and a manual valve operative to selectively control the exhaust ports to effect movement of said piston to predetermined drive positions.

13. An automatic transmission as defined in claim 1 in which said throttle and speed responsive means are operative to actuate said valve means to vary the position of said servomotor piston with respect to the selected exhaust port position, predetermined by said manual valve, to control the angular displacement of said first swash plate.

14. An automatic transmission as defined in claim 1 in which said hydraulic unit provides a first drive train between said input and output shafts, and said transmission includes a friction clutch providing a second drive train between said input and output shafts, an hydraulically-actuated device energizable to engage said clutch, and means operatively connected to said first swash plate and operable when an adjustment of said first swash plate has been made from an effective angular displacement to a displacement position nearly equal to the displacement position of said second swash plate to disable said hydraulic unit and thereby said first drive train and to energize said device to engage said clutch to establish said second drive train.

15. An automatic transmission as defined in claim 2 in which said hydraulic unit provides a first drive train between said input and output shafts, and said transmission includes a friction clutch providing a second drive train between said input and output shafts, an hydraulically-actuated device energizable to engage said clutch and means operatively connected to said first swash plate and operable when an adjustment of said first swash plate has been made from an effective angular displacement to a displacement position nearly equal to the displacement position of said second swash plate to disable said hydraulic unit and thereby said first drive train and to energize said device to engage said clutch to establish said second drive train.

16. An automatic transmission as defined in claim 14 including a valve controlling said device and operable by said first swash plate after movement thereof from its effective angular displacement position to energize said device to engage said clutch to establish said second drive train.

17. An automatic transmission as defined in claim 16 wherein said speed responsive means includes a centrifugal governor, and said throttle responsive means includes an accelerator pedal, means connecting said governor and said pedal to said valve means to combine the movements of said governor and said pedal to vary the position of said valve means and thereby the effective angular displacement of said first swash plate to a high speed ratio position and to operate said valve means to energize said device to engage said clutch and thereby connect said shafts and whereby pump and motor swash plates are moved to zero displacement position; and means operative by movement of said pedal to its full open throttle position to actuate said first swash plate to its effective angular displacement to operate said valve to deenergize said device to disengage said clutch.

* * * * *